United States Patent [19]
Leitz

[11] Patent Number: 5,016,741
[45] Date of Patent: May 21, 1991

[54] DOUBLE CAGE FREEWHEEL ASSEMBLY

[75] Inventor: Hermann Leitz, Heidelberg, Fed. Rep. of Germany

[73] Assignee: Borg-Warner Automotive, GmbH, Heidelberg, Fed. Rep. of Germany

[21] Appl. No.: 439,207

[22] Filed: Nov. 17, 1989

[30] Foreign Application Priority Data

Nov. 19, 1988 [EP] European Pat. Off. ........ 88119278.5

[51] Int. Cl.⁵ ............................................. F16D 41/07
[52] U.S. Cl. .................................. 192/45.1; 192/41 A
[58] Field of Search ........................... 192/41 A, 45.1

[56] References Cited

U.S. PATENT DOCUMENTS

| | | | |
|---|---|---|---|
| 2,677,449 | 5/1954 | Wavak | 192/45.1 |
| 2,832,450 | 4/1958 | Wade | 192/45.1 |
| 4,635,770 | 1/1987 | Shoji et al. | 192/41 A |
| 4,875,564 | 10/1989 | Leitz et al. | 192/41 A X |
| 4,911,273 | 3/1990 | Kinoshita et al. | 192/41 A |

Primary Examiner—Rodney H. Bonck
Attorney, Agent, or Firm—Emch, Schaffer, Schaub et al.; Greg Dziegielewski

[57] ABSTRACT

A freewheel assembly is disclosed. The freewheel includes an internal cage ring made of a rigid material such as a metal. An external cage ring which is made of a flexible material such as a plastic surrounds the internal cage ring. Projections extend from the frontal surfaces of the external cage ring. The projections define cams for engaging a surrounding member.

12 Claims, 9 Drawing Sheets

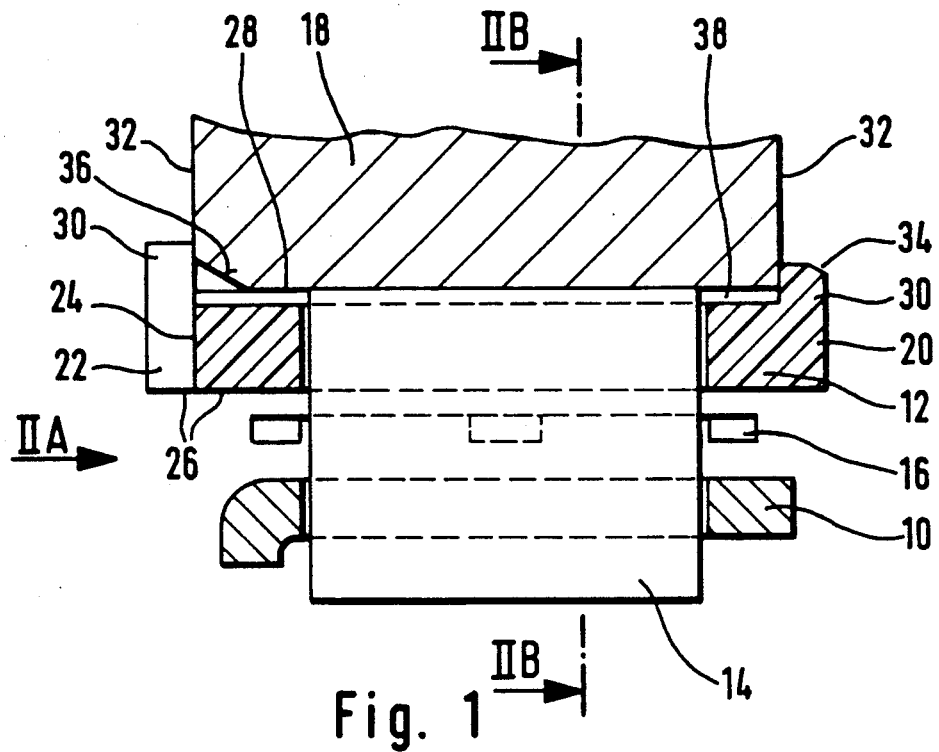
Fig. 1
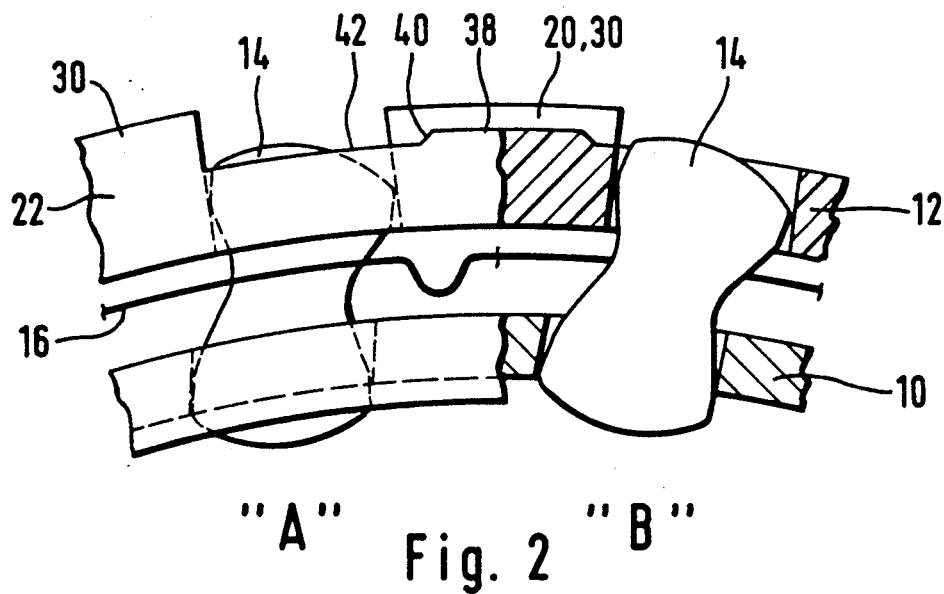
"A"  Fig. 2  "B"

DOUBLE CAGE FREEWHEEL ASSEMBLY

BACKGROUND OF THE INVENTION

The invention relates to a freewheel with a double cage which includes an internal cage ring, preferably made of metal, for example steel and an external cage ring preferably made of plastic. A catch means is formed integrally on an external ring. The external ring surrounds the external cage ring for an axially secured mounting of the freewheel.

One freewheel known in the art is disclosed in European Patent Application No. 87/107317.7. A number of cams are provided in the external housing of the external cage ring for the axial attachment of a double cage. The cams are inserted into a ring groove provided on the external ring of the freewheel.

A drawback of this prior art arrangement is the high cost of manufacturing involved in the production of the ring groove, particularly if the external ring is a hardened part.

The purpose of the present invention is to create a freewheel of the type mentioned which does not require great complex manufacturing and in which assembly is cost-effective.

SUMMARY OF THE INVENTION

A freewheel, according to the present invention, attaches to both frontal surfaces of an external cage ring and axially over the external ring, projections which, at least in part, serve as retainer elements and whose ends are in the form of cams which are radially directed towards the outside.

Such projections can be joined without any problem as a single piece with an external cage ring made of plastic. Because of the elasticity of the plastic material, they undergo movement radially towards the exterior during the mounting of the double cage in the external ring. When the final position of the double cage which is to be secured is reached, a spring action is directed towards the outside and they are placed together with the cams against the frontal sides of the external ring. In this manner, the axial attachement of the double cage is effected correctly, without requiring a particular shaping or shape of the external ring.

According to a preferred embodiment, the projections from one side of the external cage ring have a radially smaller height than those on the opposite side, so that it is possible to press the double cage into the external ring with elastic deformation of the plastic external ring and with excursion of the radically lower projections towards the inside, while the radially higher projections form an axial stop. In this manner, an insertion assembly of the double cage with the radially lower projections in the front acting as retainer elements is possible. The radially higher projections on the opposite side are preferred for reasons of stability.

The radially lower projections can be fitted with a stop. If desired, the internal housing of the external ring, on the side of the insertion, can be provided with a bevel. This simplifies the centering of the double cage and the insertion assembly.

Preferably, the projections on both sides of the external cage ring are displaced in the direction of the circumference. This arrangement is preferred for reasons of stability.

Axially projecting retainer elements on the frontal sides of the external cage ring can also be used for freewheels in which, on one or both sides of the double cage, a lateral disk is attached. The lateral disk performs the function of a bearing disk and/or an oil insulation disk. The lateral disk is then fitted with recesses through which the retainer elements extend.

The lateral disks can be secured in a resting position in the axial direction by means of a retaining structure which is constructed in a single piece with the external cage ring. Plastics technology makes it possible to form the retaining structure for the lateral disk simultaneously with the retaining elements used for the axial fixation of the double cage in a simple manner on the external cage ring.

As a retaining structure for the lateral disk, it is possible to use preferably tongue-shaped retainer elements shaped at the projections. Together with the projections, the retainer elements fit through the recesses in the lateral disk and rest against the lateral disk. The retainer element have a spring action which either is in the radial internal direction, or in the circumferential direction, and they can rest against the projections both axially externally, as well as axially internally, separated by notches.

In an alternate embodiment, the retaining structure for the lateral disks are preferably tongue-shaped retaining elements which are formed on the external cage ring separately from the projections which serve for the axial attachement of the double cage. The retainer elements then penetrate through specifically aligned punch holes of the lateral disk into which they lock.

In an additional variant, the retaining structure for the lateral disk is a boss which runs around the frontal side of the external cage ring; the boss is interrupted to permit passage of the projections which service for the axial attachment of the double cage. The lateral disk can have several beads which are preferably distributed evenly over its circumference, resting behind the boss and therefore achieving axial attachment of the lateral disk.

Projecting clips made of metal can be embedded in the external housing of the external cage ring. Such clips guarantee a friction lock between the external cage ring and the external ring, which, if abrasion is low, achieve a lasting good brake effect.

Preferably, the clips are axially anchored on one side in the external cage ring, while on the other axial side they are loosely supported in the external housing of the external cage ring. The axial anchoring on the one side leaves an appropriate range of play of the clips for the brake effect. In addition, after completion of the injection, a simple calibration of the clips is possible.

The clips can be part of a clip band which is embedded over the entire circumference into the external cage ring. This form of construction has advantages from a finishing technology point of view. It is achieved by a correct positioning and the direction of the chips is achieved by a simple means.

However, it is also possible to inject separate clips into the external cage ring. These clips are preferably made in the form of a band material and they are cut off from the band before injection. This latter embodiment saves material and it is therefore particularly preferred for freewheels with only a few clips distributed over the circumference.

The invention is explained in further detail below with reference to the embodiments represented in the figures. With the exception of FIGS. 16 and 17, the figures with odd numbers represent the double cage of a clamp body-freewheel which is axially attached in an external ring. The catch elements which serve this function are shifted in the direction of the circumference. Figures with even numbers represent the double cage alone.

DESCRIPTION OF THE DRAWINGS

FIG. 1 is a radial cross section of the first double cage freewheel;

FIG. 2 is (on the left) a side view of the associated double cage with the direction of observation indicated by the arrow IIA of FIG. 1, and is (on the right) a cross section along the line IIB of FIG. 1;

DESCRIPTION OF THE PREFERRED EMBODIMENTS

Figure 3:
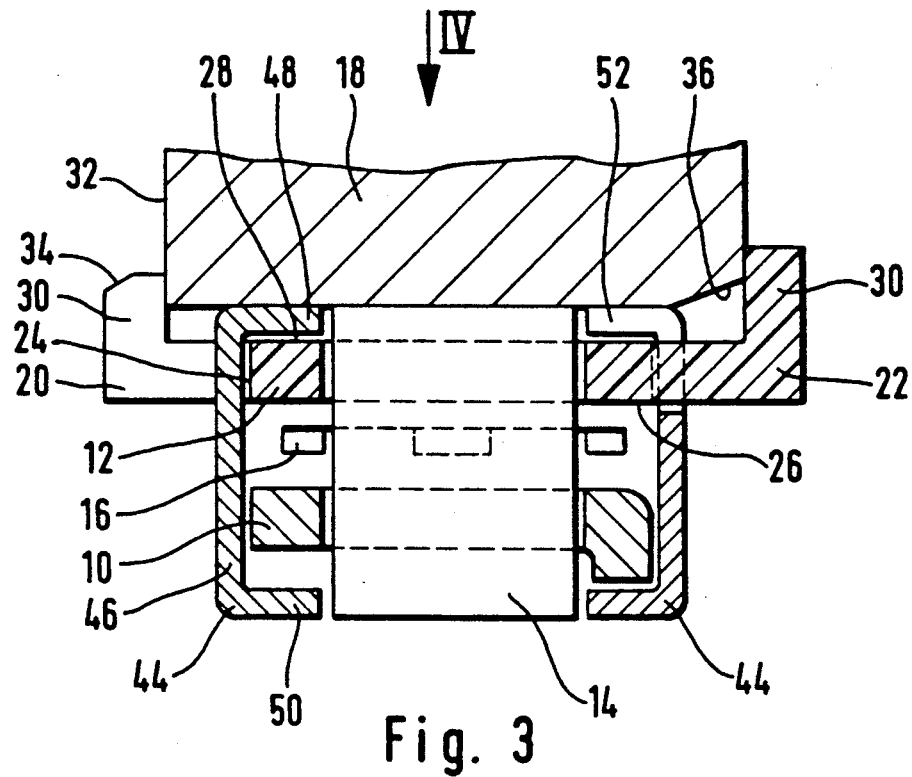
FIG. 3 is the radial cross section of a second double cage freewheel.

The clamp body freewheel with double cage represented in FIGS. 1 and 2 has an internal cage ring 10 made of metal, particularly steel, and an external cage ring 12 made of plastic. Recesses of the internal cage ring and the external cage ring, which are distributed over their circumferences, hold a number of clamp bodies 14, and they are supported by a common spring 16 located between the rings, in a direction of the clamp. The double cage with clamp bodies 14 and spring 16 is a prefabricated unit which is built into freewheel external ring 18 which surrounds the exterior of external cage ring 12. A snap connection is provided between external cage ring 12 and external ring 18, which results in an axial attachment of the double cage in external ring 18.

For the snap connection, a number of projections 20, 22 are formed on both frontal sides of the external cage ring, and they project axially over external ring 18. Projections 20, 22 are formed as an integral part of external cage ring 12 using plastics technology. They are short ring segments which are placed on frontal surfaces 24 of external cage ring 12. They end up flush with the external cage ring 12 at internal housing 26, and they project radially towards the exterior over the latter's external housing 28. This results in the formation of cams 30 which are in contact with frontal sides 32 of external ring 18, they achieve an axial attachment of the external cage ring 12 and the external ring 18.

Projections 20, 22 in each case are evenly distributed over the circumference of external cage ring 12. In FIG. 1, the projections are drawn with a shift in the direction of the circumference on one side of external cage ring 12, as if projections 20, 22 were axially aligned. As one can see in FIG. 2, projections 20 are in fact shifted in the direction of the circumference on one side of external cage ring 12 with respect to those on the other side of external cage ring 12.

In FIG. 1, projections 20 on the right side of external ring 12 have a radially lower height than those 22 on the opposite side. Bevel 34 is provided on the external ring of the radially lower projections 20. Freewheel external ring 18, on the opposite side, which is the insertion side for the double cage, is fitted with a conical expansion 36 in the internal ring, which forms a stop flange for projections 20. The conical angle of expansion 36 corresponds to that of cam 34. The radially higher projections 22 have dimensions such that they clearly project radially towards the exterior beyond expansion 36.

During the plug assembly, the double cage with radially lower projections 20 is inserted in a front position in conical expansion 36 of freewheel external ring 18 and it is centered. Subsequently, the double cage is pressed into external ring 18, during which process projections 20 are pressed radially towards the interior and external cage ring 12 which is made of plastic is elastically deformed. At the end of the insertion motion, the radially higher projections 22 reach their abutment position at frontal side 32, on the insertion side, of external ring 18, with spring action towards the outside of the radially lower projections 20 which function as catch elements and come in contact with frontal side 32 on the opposite side.

A number of axial lands 38 are integrally formed on the external housing of external cage ring 12, with a shift in the direction of the circumference. Lands 38 with sloped surfaces 40 go over into cylinder housing 42 of external cage ring 12. Their purpose is to achieve a friction lock of external cage ring 12 with freewheel external ring 18.

Figure 4:
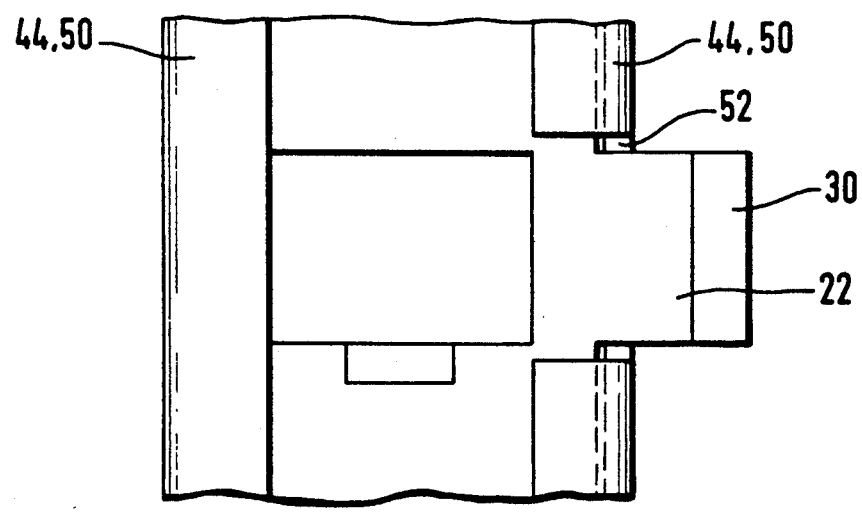
FIG. 4 is a top view of the associated double cage with the direction of observation indicated by the arrow IV of FIG. 3.

The freewheel shown in FIGS. 3 and 4 have lateral disks 44 on both frontal sides of the double cage, which can function as bearing disks or brace rings and/or oil barrier disks. Lateral disks 44 have a U-shaped ring profile. Their construction includes an axially externally located floor 46 and a facing opening in the double cage, with external ring land 48 surrounding external cage ring 12 and internal ring land 50 surrounding internal cage ring 10. Lateral disks 44 are recessed in the assembly opening or freewheel external ring 18.

Tongue-shaped projections 20, 22 which are axially directed towards the outside are formed on external cage ring 12 using plastics technology, and, as in the implementation example described above, their function is to provide a rest for the double cage at external ring 18. Projections 20, 22 extend through recesses 52 in lateral disks 44, and they abut with cams 30 which are radially directed towards the outside against frontal sides 32 of external ring 18. As in the implementation example described above, projections 20 are formed on one side of the double cage as a stop element and they are radially lower, while the radially higher projections 22 on the opposite side serve as an abutment during the plug assembly. Recesses 52 in lateral disks 44 interrupt external ring land 48, and they extend into floor 46.

Figure 5:
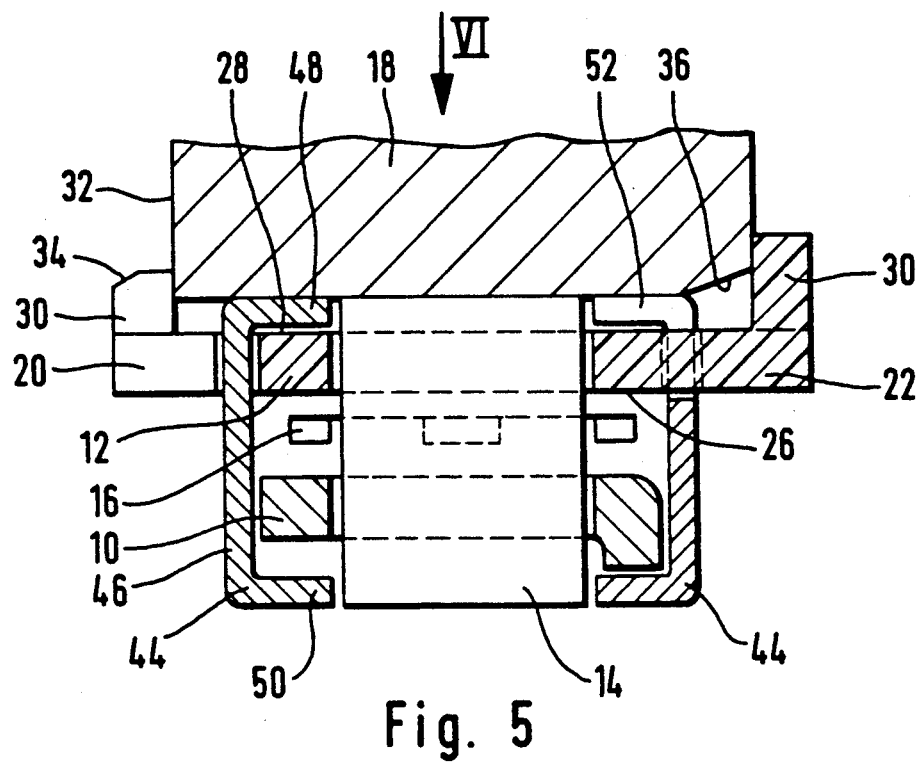
FIG. 5 is a radial cross section of a third double cage freewheel.
Figure 6:
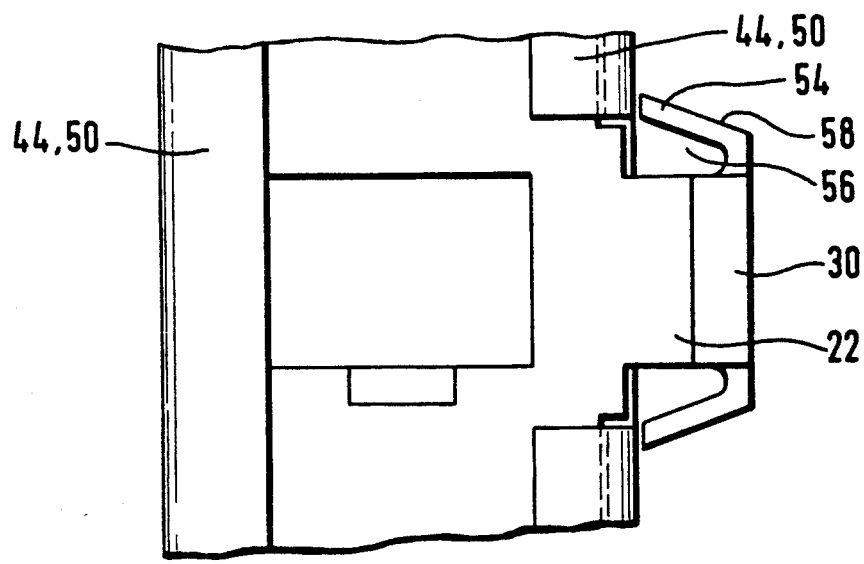
FIG. 6 is a radial top view of the associated double cage with the direction of observation indicated by the arrow VI of FIG. 5.

In the embodiments represented in FIGS. 5 through 14, lateral disks 44 are attached by retainer structures so that they rest in the axial direction, which, like projections 20, 22, are formed integrally on external cage ring 13 using plastics technology. In FIGS. 5 and 6, one can see tongues 54 which are formed on projections 20, 22, and directed obliquely towards the exterior in the direction of the circumference on both sides of the ends of the projections 20, 22. The base of tongues 54 is separated axially from lateral disks 44. In the related state (FIG. 6), tongues 54 are bent away from projections 20, 22 so that their ends are in a position opposite to lateral disks 44 forming an axial block. Angle 56 formed by projections 20, 22 permits a spring action of tongues 54 towards each other.

During the assembly of lateral disks 44, projections 20, 22 with tongues 54 are inserted through recesses 52. Thus, slanted flanges 58 of tongues 54 come in contact with the edges of recess 52, which results in an elastic shift of tongues 54, and by spring action they assume, after passing recess 52, a position before floor 46 of lateral disk 44.

Figure 7:
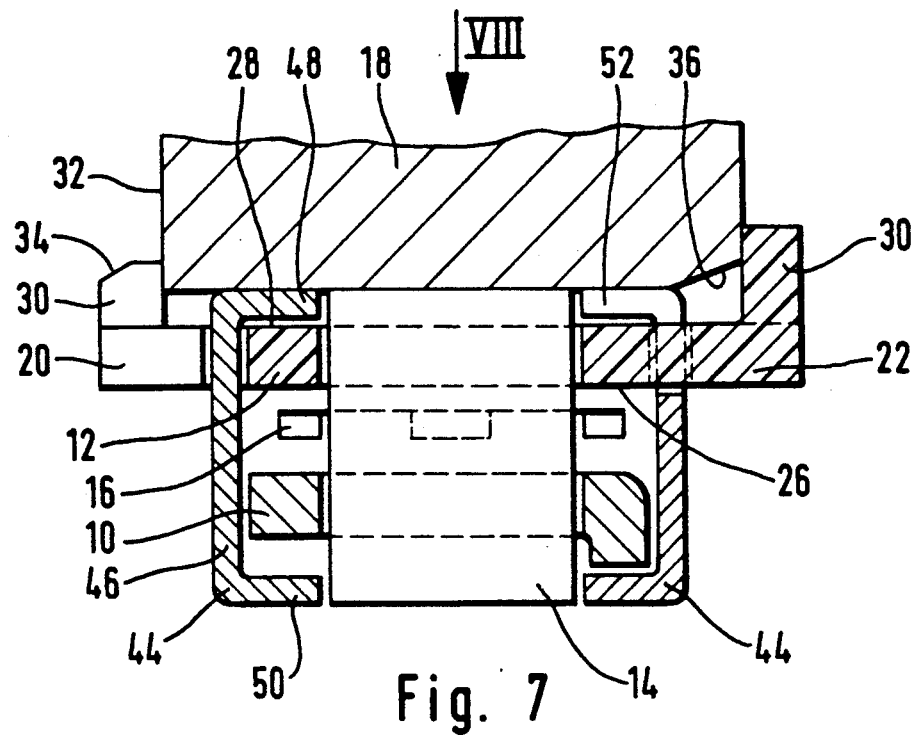
FIG. 7 is a radial cross section of a fourth double cage freewheel.
Figure 8:
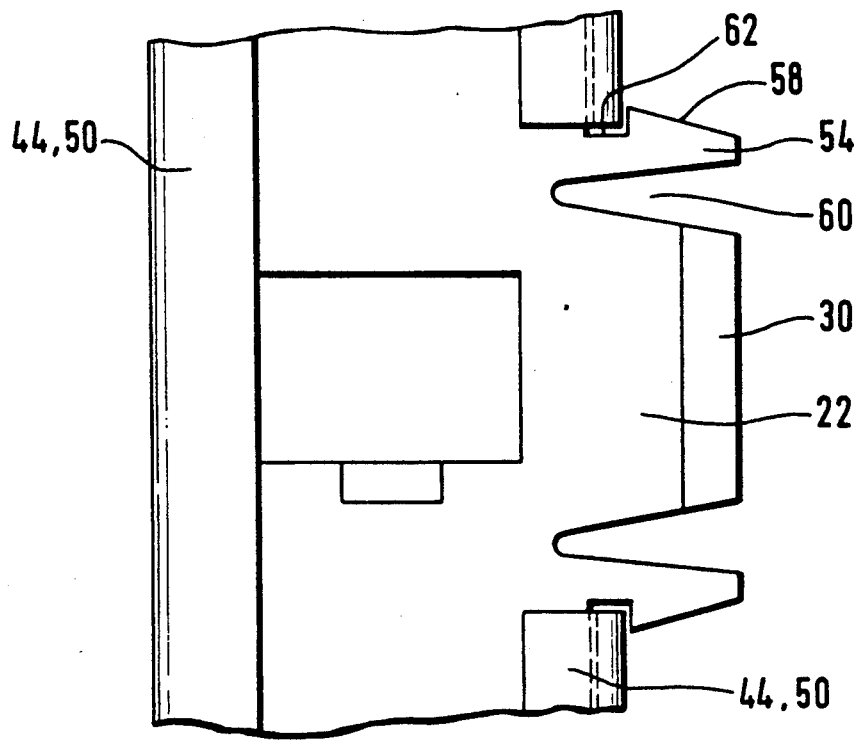
FIG. 8 is a radial top view of the associated double cage with the direction of observation indicated by the arrow VIII of FIG. 7.

FIGS. 7 and 8 illustrate another implementation form for stop tongues 54 for lateral disks 44. Tongues 54 are internally located here axially at projections 20, 22, from which they are separated by axial notches 60 which permit compression of tongues 54. Notches 60 have an essentially triangular shape which broadens towards the exterior. Lateral disk 44 rests at back cut 62 behind sloped flanges 58 of tongues 54.

Figure 9:
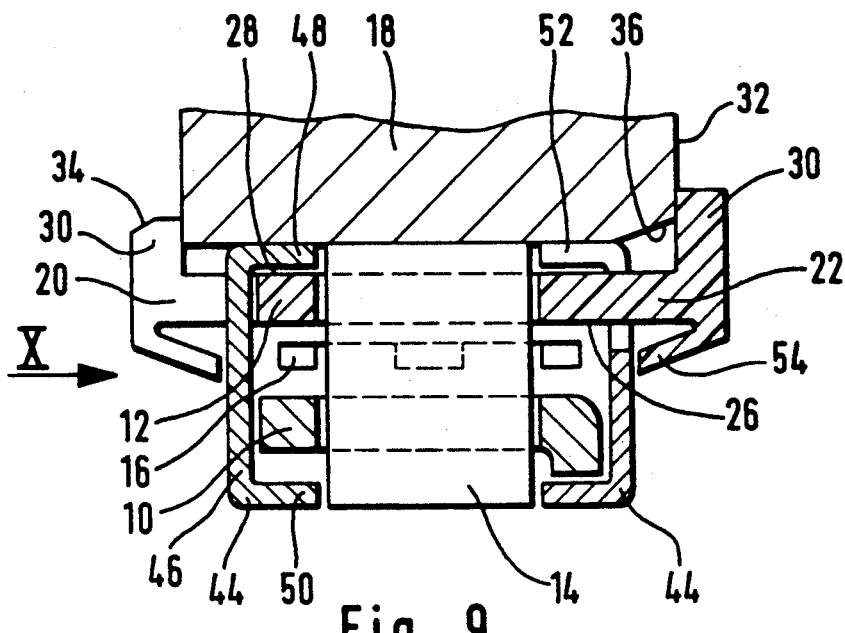
FIG. 9 is a radial cross section of a fifth double cage freewheel.
Figure 10:
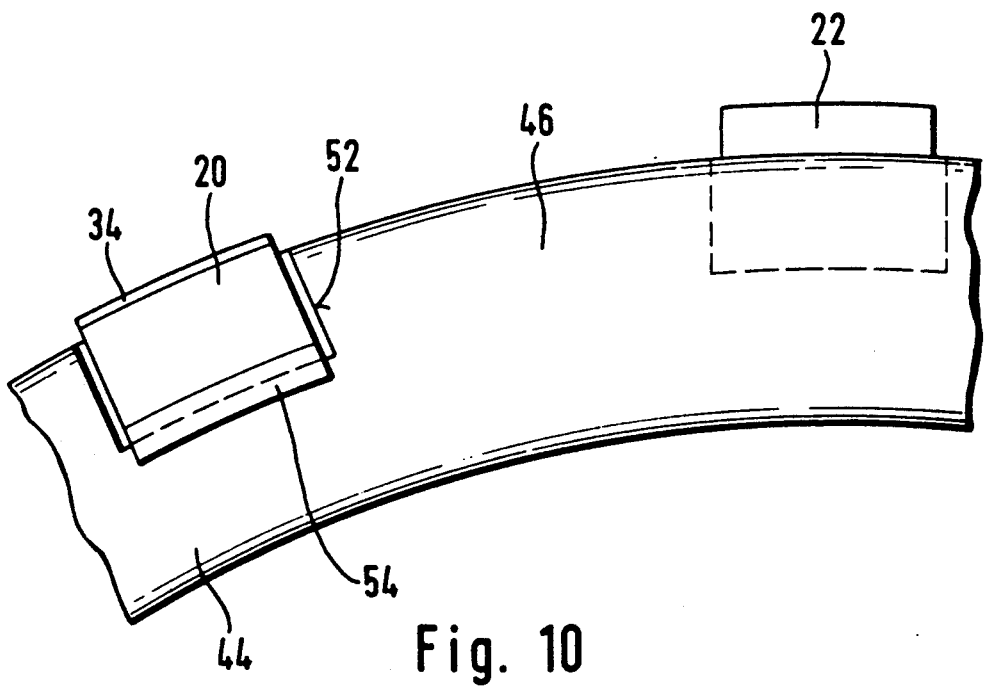
FIG. 10 is a side view of the associated double cage with the direction of observation indicated by the arrow X of FIG. 9.

In the implementation example according to FIGS. 9 and 10, tongue 54, with spring action radially directed toward the inside, is formed axially externally on each projection 20, 22, which is separated from projection 20, 22 similarly to that in FIGS. 5 and 6 and whose free end assumes position before floor 46 of lateral disk 44.

Figure 11:
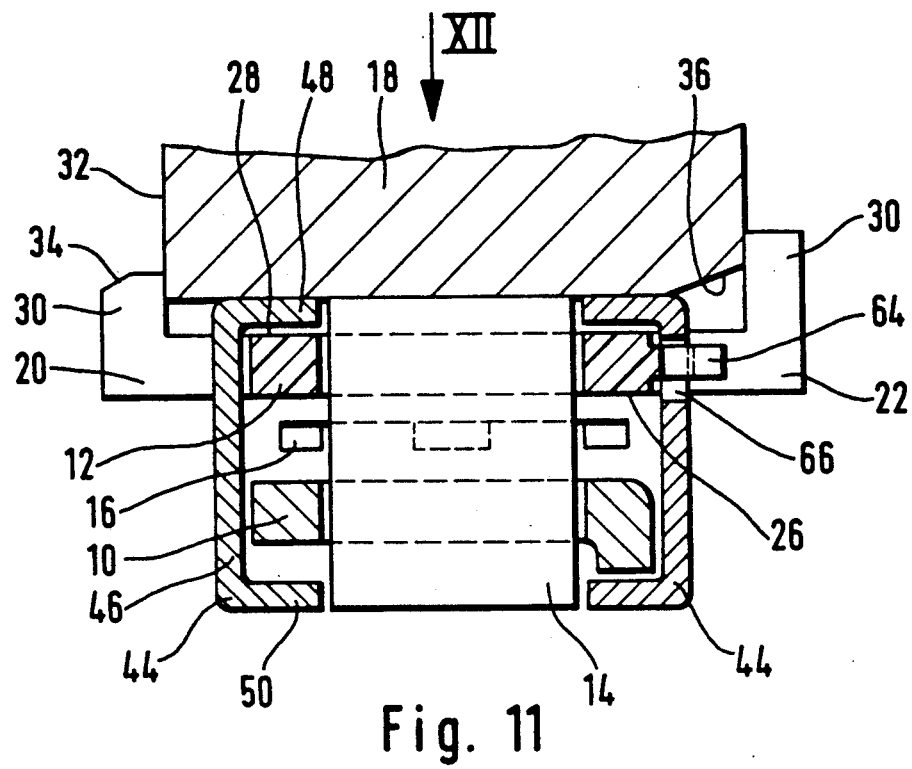
FIG. 11 is a radial cross section of a sixth double cage freewheel.
Figure 12:
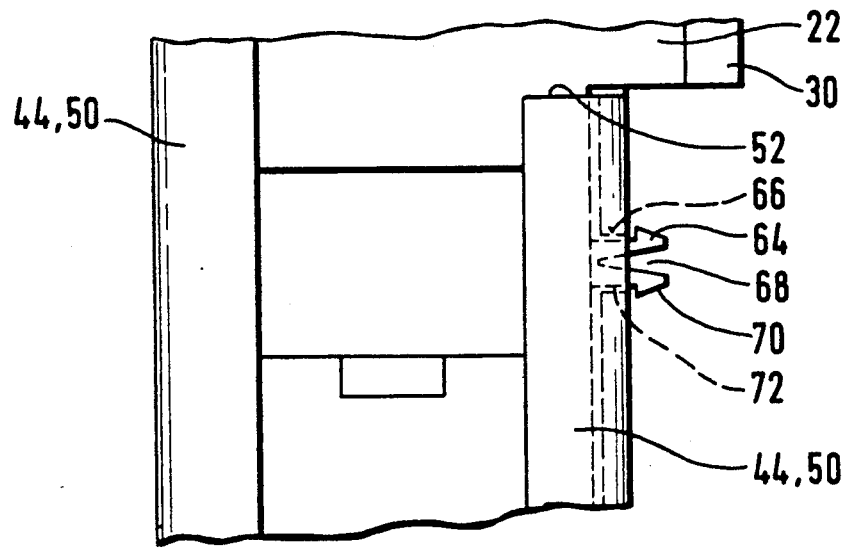
FIG. 12 is a radial top view of the associated double cage with the direction of observation indicated by the arrow XII of FIG. 11.

FIGS. 11 and 12 show a variant in which the tongue-shaped retainer elements 64, which serve for the axial securing of the lateral disks, are formed separately from projections 20, 22 on external cage ring 12. Retainer elements 64 project axially away form ring 12, and they penetrate through punch holes 66 which are specifically provided for that function in floor 46 of lateral disk 44. In FIGS. 11 and 12, a double-tongue arrangement is illustrated, with tongues having spring action towards each other, through axial wedge slit 68 whose head has sloped flanges 70 which come in contact with the edge of punch holes 66, behind which back cuts 72 are located which hold lateral disks 44.

Figure 13:
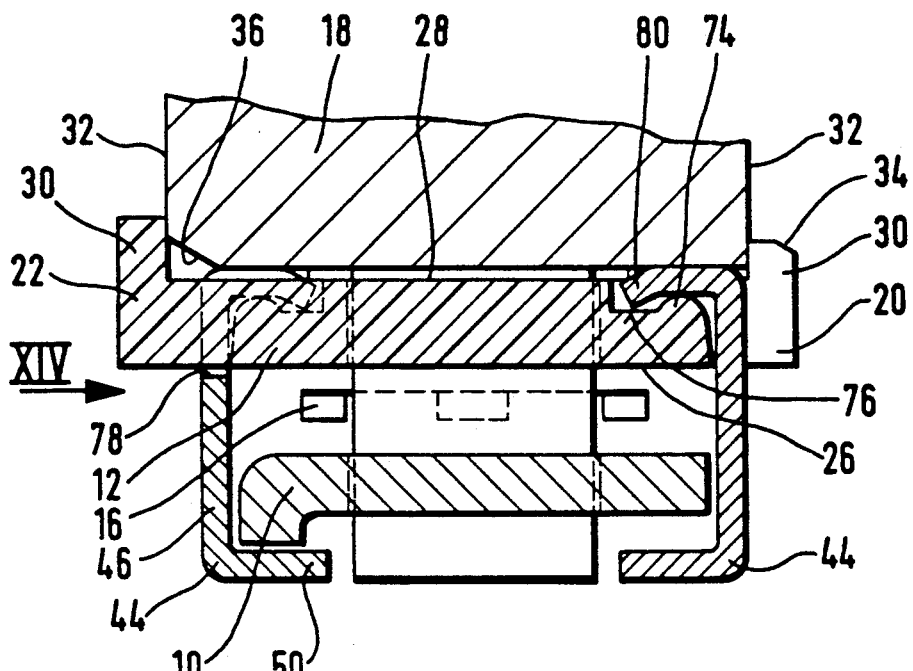
FIG. 13 is a radial cross section of a seventh double cage freewheel.
Figure 14:
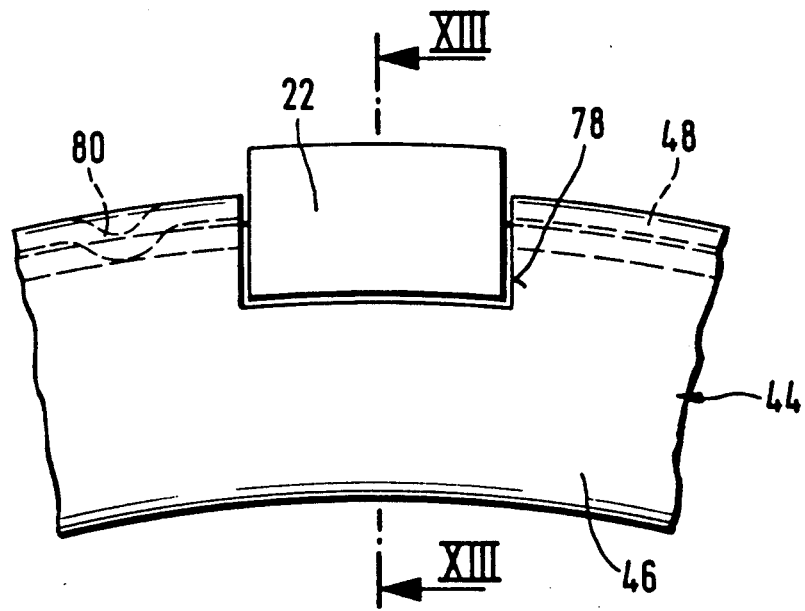
FIG. 14 is a side view of the associated double cage of FIG. 13.

In FIGS. 13 and 14, the retaining structure for lateral disks 44 includes a bead 74 which runs around the frontal side of external cage ring 12, and behind which groove 76 is located, shifted axially towards the interior. Bead 74, with respect to the groove 76 is in a position radially towards the exterior; however, the bead has a smaller external diameter than external surface 28 of external cage ring 12. The lateral disk 44 includes recesses 78 for the passage of projections 20, 22. Recesses 78 interrupt both the bead 74 as well as the adjacent groove 76. External ring lands 48 of lateral disks 44 extend over beads 74. They are fitted with several beads 80 which are evenly distributed over the circumference of lateral disks 44, which assume a resting position in groove 76, which results in axial attachement of lateral disks 44 at external cage ring 12. Two diametrically opposite beads 80 on each lateral disk 44 suffice.

Figure 15:
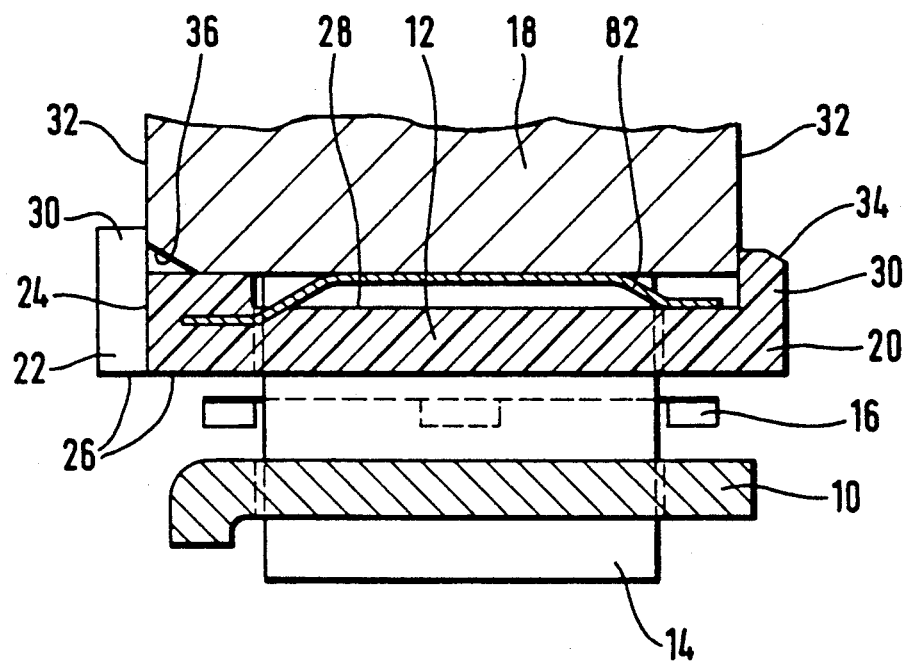
FIG. 15 is a radial cross section of an eighth double cage freewheel, with clips embedded in the external cage ring.
Figure 16:
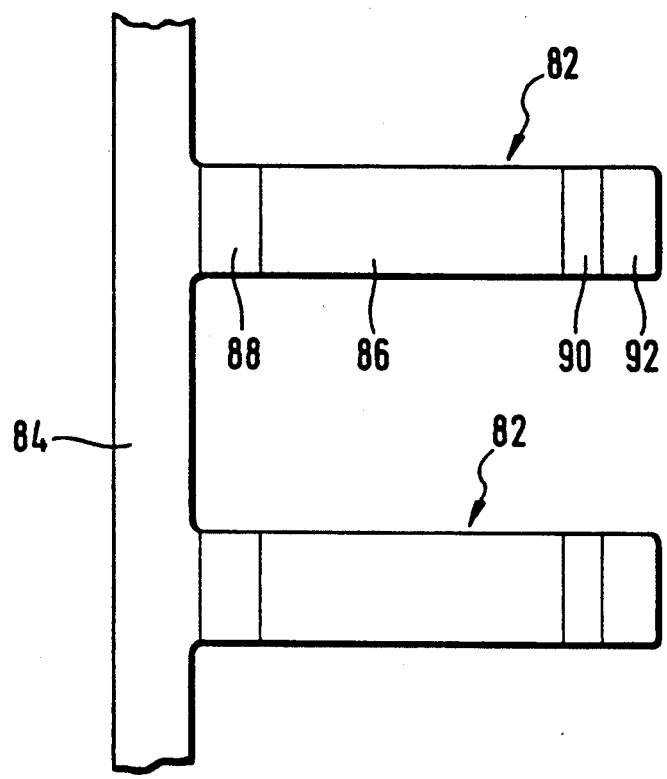
FIG. 16 is a view of the housing of an associated clip band.
Figure 17:
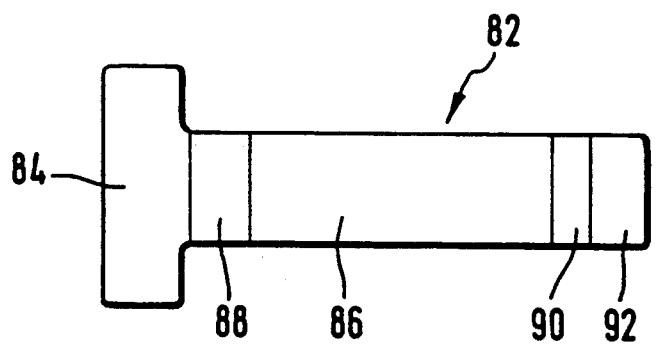
FIG. 17 is a view similar to FIG. 16 and showing a single clip.

With reference to FIGS. 15 through 17, instead of lands 38 which, as illustrated in FIG. 1 and FIG. 2, are an integral part of external cage ring 12, it is also possible to embed clips 82, which now assume the function of a friction lock, and which are made of metal, in the plastic material on external cage ring 12. Clips 82, preferably with spring action, extend in the axial direction between the windows provided for the clamp bodies in external cage ring 12, with clips 82 provided between all windows or between only part of the windows. Clips 82 are at a height which is similar to that of lands 38, beyond the external housing 28 of external cage ring 12. They are arranged for the brake effect and are less subject to abrasion than lands 38, which are made of plastic, so that their service like is longer.

According to FIG. 16, clips 82 are manufactured as a part of the cam-like infinite band with a flat continuous back 84. Clips 82, which form the tongues of the cam, have flat contact section 86 which comes in contact with external ring 18, which forms an angle over ramp 88 with respect to back 84 and which extends parallel with respect to the ramp at an interval. At their free end, clips 22 are crimped in the direction towards the back 84, which results in the formation of a second ramp 90 and foot 92 which rests against external housing 28 of external cage ring 12.

During the manufacturing of external cage ring 12, a section of the clip band is cut off, bent into the shape of a closed ring, and inserted in the injection mold for external cage ring 12. Back 84 of the band is surrounded by sprayed plastic and thus anchored in external cage ring 12. The ends of clips 82 remain free. After the pouring, clips 82 can undergo a post-treatment with a calibration tool.

Instead of a section of the clip band, it is possible to attach separate clips 82, which have been cut from the clip band as illustrated in FIG. 17, to the external cage ring 12 by injection.

I claim:

1. A freewheel assembly comprising, an internal cage ring made of a rigid metal material, an external cage ring having opposed frontal surfaces made of a flexible plastic material and surrounding said internal cage ring, and catch means on said external cage ring, said catch means including projections attached adjacent said frontal surfaces of said external cage ring, said projections extending axially beyond said frontal surfaces, said projections defining cams for engaging a surrounding member, said projections on one side of said external cage ring having a radially smaller height than said projections on the other side of said external cage ring, the lower projections on the side having a radially smaller height being provided with a bevel, whereby during assembly said external cage ring elastically deforms and the higher projections form an axial stop.

2. A freewheel assembly, according to claim 1, including a lateral disk member attached adjacent at least one side of said internal and external cage rings, said lateral disk member defining recesses, said projections extending through said recesses.

3. A freewheel assembly according to claim 2, including retaining means on said external cage ring for maintaining said lateral disk member in a rest position in the axial direction.

4. A freewheel assembly, according to claim 3, wherein said retaining means comprises tongue-shaped retaining elements extending from said projections.

5. A freewheel assembly, according to claim 3, wherein said retaining means comprises tongue-shaped retaining elements on said external cage ring separate from said projections, said retaining elements mating with aligned holes defined by said disk member.

6. A freewheel assembly, according to claim 1, wherein said exterior cage ring defines an exterior surface, including a plurality of clips positioned on said exterior surface for engaging a surrounding external ring member.

7. A freewheel assembly, according to claim 6, wherein each of said clips is anchored at one end of said external cage ring and loosely supported axially at its other end.

8. A freewheel assembly, according to claim 6, wherein said clips are positioned on a clip band, said clip band embedded around said exterior surface of said external cage ring.

9. A freewheel assembly, according to claim 6, wherein said clips are individually embedded into said external cage ring.

10. A freewheel assembly comprising, an internal cage ring made of a rigid material, an external cage ring having opposed frontal surfaces made of a flexible material surrounding said internal cage ring, catch means on said external cage ring, said catch means including projections attached adjacent said frontal surfaces of said external cage ring, said projections extending axially beyond said frontal surfaces, said projections defining cams for engaging a surrounding member, a lateral disk member attached adjacent at least one side of said internal and external cage rings, said lateral disk member defining recesses, said projections extending through said recesses, and retaining means on said external cage ring for maintaining said lateral disk member in a rest position in the axial direction, said retaining means comprising tongue-shaped retaining elements on said external cage ring separate from said projections, said retaining elements mating with aligned holes defined by said lateral disk member.

11. A freewheel assembly comprising, an internal cage ring made of a rigid material, an external cage ring having opposed frontal surfaces made of a flexible material surrounding said internal cage ring, catch means on said external cage ring, said catch means including projections attached adjacent said frontal surfaces of said external cage ring, said projections extending axially beyond said frontal surfaces, said projections defining cams for engaging a surrounding member, said external cage ring defining an exterior surface, and a plurality of clips positioned on said exterior surface for engaging the surrounding member, said clips being positioned on a clip band, said clip band embedded around said exterior surface of said external cage ring.

12. A freewheel assembly comprising, an internal cage ring made of a rigid material, an external cage ring having opposed frontal surfaces made of a flexible material surrounding said internal cage ring, catch means on said external cage ring, said catch means including projections attached adjacent said frontal surfaces of said external cage ring, said projections extending axially beyond said frontal surfaces, said projections defining cams for engaging a surrounding member, said external cage ring defining an exterior surface, and a plurality of clips positioned on said exterior surface for engaging the surrounding member, said clips being individually embedded into said external cage ring.

* * * * *